(12) United States Patent
Kanugovi et al.

(10) Patent No.: US 12,185,237 B2
(45) Date of Patent: Dec. 31, 2024

(54) APPLICATION BASED ROUTING OF DATA PACKETS IN MULTI-ACCESS COMMUNICATION NETWORKS

(71) Applicant: Nokia Technologies Oy, Espoo (FI)

(72) Inventors: Satish Kanugovi, Bengaluru (IN); Hannu Flinck, Helsinki (FI); Salil Agarwal, Bangalore (IN); Krishna Pramod Adharapurapu, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/400,642

(22) Filed: Dec. 29, 2023

(65) Prior Publication Data

US 2024/0137853 A1 Apr. 25, 2024

Related U.S. Application Data (62) Division of application No. 16/966,743, filed as application No. PCT/FI2019/050035 on Jan. 18, 2019, now Pat. No. 11,902,890.

(30) Foreign Application Priority Data

Feb. 3, 2018 (IN) .............................. 201841004142

(51) Int. Cl.
*H04W 48/18* (2009.01)
*H04L 45/24* (2022.01)
(Continued)

(52) U.S. Cl.
CPC ............. *H04W 48/18* (2013.01); *H04L 45/24* (2013.01); *H04L 67/563* (2022.05); *H04L 69/14* (2013.01);
(Continued)

(58) Field of Classification Search
CPC ..... H04W 48/18; H04W 48/20; H04W 76/15; H04W 88/06; H04L 67/563; H04L 45/24; H04L 69/14
See application file for complete search history.

(56) References Cited

U.S. PATENT DOCUMENTS 6,324,517 B1  11/2001  Bingham et al.
7,720,933 B2   5/2010  Gordon et al.
(Continued)

FOREIGN PATENT DOCUMENTS

EP       2961225 A1    12/2015
WO    2014130091 A1     8/2014
(Continued)

OTHER PUBLICATIONS

International Search Report and Written Opinion of PCT/FI2019/050035, dated Mar. 29, 2019, 44 pages.
(Continued)

*Primary Examiner* — Jenee Holland
(74) *Attorney, Agent, or Firm* — Ryan, Mason & Lewis, LLP (57) ABSTRACT

Aspects related to application based routing of data packets is described. In an example, a method for enabling application based routing of data packets includes retrieving, by a client device, a prioritized list of client application parameters to process data packets from at least one client application. The prioritized list is generated based on application support capabilities of the client device. The method includes transmitting client parameters to a network server to create at least one multi-path proxy (MPP) instance. Each MPP instance of the at least one MPP instance is configured to aggregate and route data packets to a pre-defined core network link. The method further includes receiving identification information pertaining to the at least one MPP instance from the network server. Based on the identification (Continued)

information, the prioritized list is assigned to the at least one MPP instance to process data packets from at least one client application.

20 Claims, 7 Drawing Sheets

(51) Int. Cl.
| | |
|---|---|
| *H04L 45/302* | (2022.01) |
| *H04L 47/24* | (2022.01) |
| *H04L 67/563* | (2022.01) |
| *H04L 69/14* | (2022.01) |
| *H04L 69/24* | (2022.01) |
| *H04W 48/20* | (2009.01) |
| *H04W 76/15* | (2018.01) |
| *H04W 88/06* | (2009.01) |

(52) U.S. Cl.
CPC ............ *H04W 48/20* (2013.01); *H04W 76/15* (2018.02); *H04W 88/06* (2013.01)

(56) References Cited

U.S. PATENT DOCUMENTS

| | | | |
|---|---|---|---|
| 8,099,490 | B2 | 1/2012 | Deakin |
| 8,112,545 | B1 | 2/2012 | Ong |
| 8,301,756 | B2 | 10/2012 | Thakker |
| 8,553,680 | B2 | 10/2013 | Veenstra et al. |
| 8,621,570 | B2 | 12/2013 | Naslund et al. |
| 8,700,736 | B2 | 4/2014 | Lee et al. |
| 8,782,206 | B2 | 7/2014 | Hofmann et al. |
| 8,982,835 | B2 | 3/2015 | Park et al. |
| 9,532,210 | B2 | 12/2016 | Hao et al. |
| 9,565,141 | B2 | 2/2017 | Song et al. |
| 9,652,743 | B2 | 5/2017 | Zhu et al. |
| 9,749,282 | B2 | 8/2017 | Jain et al. |
| 2007/0091836 | A1 | 4/2007 | Oprescu-Surcobe et al. |
| 2007/0266085 | A1 | 11/2007 | Rajko et al. |
| 2008/0279119 | A1 | 11/2008 | Stille et al. |
| 2008/0316925 | A1 | 12/2008 | Dolin et al. |
| 2010/0177691 | A1 | 7/2010 | Patil et al. |
| 2011/0002466 | A1 | 1/2011 | Kwak et al. |
| 2011/0151924 | A1 | 6/2011 | Miller |
| 2011/0154211 | A1 | 6/2011 | Yu et al. |
| 2011/0164537 | A1 | 7/2011 | Cai et al. |
| 2011/0289172 | A1 | 11/2011 | Marcellino |
| 2011/0296006 | A1* | 12/2011 | Krishnaswamy ....... H04L 67/04 709/227 |
| 2011/0296031 | A1 | 12/2011 | Arnold |
| 2011/0320588 | A1 | 12/2011 | Raleigh |
| 2012/0066737 | A1 | 3/2012 | Zhang et al. |
| 2012/0221628 | A1 | 8/2012 | Fujigaki |
| 2012/0329501 | A1 | 12/2012 | Balck et al. |
| 2012/0331160 | A1* | 12/2012 | Tremblay ................ H04L 67/56 709/228 |
| 2013/0021933 | A1 | 1/2013 | Kovvali et al. |
| 2013/0021968 | A1 | 1/2013 | Reznik et al. |
| 2013/0094363 | A1 | 4/2013 | Duan |
| 2013/0163409 | A1 | 6/2013 | Ellison et al. |
| 2013/0191401 | A1 | 7/2013 | Xia et al. |
| 2013/0208659 | A1 | 8/2013 | Nishida |
| 2013/0223290 | A1 | 8/2013 | Zhou et al. |
| 2014/0059158 | A1 | 2/2014 | Chen et al. |
| 2014/0064176 | A1 | 3/2014 | Anchan |
| 2014/0068064 | A1 | 3/2014 | Anchan et al. |
| 2014/0140237 | A1 | 5/2014 | Ma et al. |
| 2014/0241253 | A1 | 8/2014 | Pison et al. |
| 2014/0301334 | A1 | 10/2014 | Labranche et al. |
| 2014/0321283 | A1 | 10/2014 | Thyni et al. |
| 2015/0017917 | A1 | 1/2015 | Guo et al. |
| 2015/0089587 | A1 | 3/2015 | Hurtta |
| 2015/0131478 | A1 | 5/2015 | Bouvet |
| 2015/0153810 | A1 | 6/2015 | Sasidharan et al. |
| 2015/0172862 | A1 | 6/2015 | Kau et al. |
| 2015/0188810 | A1 | 7/2015 | Salkintzis |
| 2015/0254248 | A1 | 9/2015 | Burns et al. |
| 2015/0288658 | A1 | 10/2015 | Jung et al. |
| 2015/0304405 | A1 | 10/2015 | Zhu et al. |
| 2015/0304939 | A1 | 10/2015 | Liu et al. |
| 2015/0310300 | A1 | 10/2015 | Hou et al. |
| 2016/0057185 | A1 | 2/2016 | Zhang |
| 2016/0205494 | A1 | 7/2016 | Sun |
| 2016/0249388 | A1 | 8/2016 | Liu et al. |
| 2016/0307277 | A1 | 10/2016 | Wengrower |
| 2016/0345226 | A1 | 11/2016 | Keller et al. |
| 2016/0381187 | A1 | 12/2016 | Sugaya |
| 2017/0054631 | A1* | 2/2017 | Horn ..................... H04W 40/02 |
| 2017/0091335 | A1 | 3/2017 | Liu et al. |
| 2017/0116669 | A1 | 4/2017 | Wickstrom et al. |
| 2017/0126748 | A1 | 5/2017 | Le Sage et al. |
| 2017/0139658 | A1 | 5/2017 | Nagata et al. |
| 2017/0235733 | A1 | 8/2017 | Florance et al. |
| 2017/0236224 | A1 | 8/2017 | Florance et al. |
| 2017/0237675 | A1 | 8/2017 | Srinivasan et al. |
| 2017/0262925 | A1 | 9/2017 | Rangasamy Kannadasan et al. |
| 2017/0264711 | A1 | 9/2017 | Natarajan et al. |
| 2017/0317894 | A1 | 11/2017 | Dao et al. |
| 2017/0339650 | A1 | 11/2017 | Jung et al. |
| 2018/0007090 | A1 | 1/2018 | Cao et al. |
| 2018/0103363 | A1 | 4/2018 | Faccin et al. |
| 2018/0270713 | A1 | 9/2018 | Park et al. |
| 2018/0367578 | A1 | 12/2018 | Verma et al. |
| 2019/0037409 | A1 | 1/2019 | Wang et al. |
| 2019/0158537 | A1 | 5/2019 | Miriyala |
| 2019/0174366 | A1 | 6/2019 | Susitaival et al. |
| 2019/0230560 | A1 | 7/2019 | Huang et al. |
| 2019/0268375 | A1* | 8/2019 | Gundavelli ........... H04L 63/102 |
| 2019/0363974 | A1* | 11/2019 | Wang .................... H04L 67/141 |
| 2020/0007664 | A1 | 1/2020 | Kanugovi et al. |
| 2020/0205204 | A1 | 6/2020 | Lin et al. |
| 2020/0236043 | A1* | 7/2020 | Sze ......................... H04L 49/90 |
| 2020/0359264 | A1* | 11/2020 | Rácz ..................... H04W 76/16 |
| 2020/0383158 | A1* | 12/2020 | Misra .................... H04L 65/403 |
| 2021/0143890 | A1* | 5/2021 | Legg ..................... H04B 7/0695 |
| 2021/0185493 | A1* | 6/2021 | Legg ..................... H04W 76/12 |
| 2021/0385154 | A1* | 12/2021 | Wang .................... H04L 12/66 |

FOREIGN PATENT DOCUMENTS

| | | |
|---|---|---|
| WO | 2018007591 A1 | 1/2018 |
| WO | 2018149581 A1 | 8/2018 |

OTHER PUBLICATIONS

European Search Report of 19747775.5, dated Oct. 21, 2021, 13 pages.

* cited by examiner

APPLICATION BASED ROUTING OF DATA PACKETS IN MULTI-ACCESS COMMUNICATION NETWORKS

FIELD OF INVENTION

The present subject matter relates to routing of data packets in multi-access communication networks and, particularly, but not exclusively, to application based routing of data packets in a multi-access communication network.

BACKGROUND

A multi-access communication network, generally provides a network terminal, such as a network server to allow a client device to connect to multiple access technologies, such as Wi-Fi, Long-Term Evolution (LTE), and the like, as well as to utilize various different paths for transmission of data packets to and from an application server. The network terminal, thus, handles the transmission of data packets to and from the application server and controls distribution of data traffic across the multiple access technologies.

SUMMARY

This summary is provided to introduce concepts related to application based routing of data packets in a multi-access communication network. This summary is not intended to identify essential features of the claimed subject matter nor is it intended for use in determining or limiting the scope of the claimed subject matter.

In an aspect of the present subject matter, a method for enabling application based routing of data packets in a multi-access communication network is described. The method includes transmitting, by a network connection engine (NCE) in a network server, network parameters to an application server. The application server hosts an application. In an example, the network parameters are indicative of application support capabilities of the network server. The method further includes receiving a prioritized list of application parameters, based on the network parameters. The application parameters facilitate in routing data packets to the application server. In addition, the method includes storing the prioritized list of application parameters for being used while routing the data packets to the application server.

In an aspect of the present subject matter, a method for enabling application based routing of data packets in a multi-access communication network is described. The method includes retrieving a prioritized list of client application parameters to process data packets from at least one client application. The prioritized list of client application parameters is generated based on application support capabilities of a client device. The method further includes transmitting client parameters, indicative of communication capabilities of the client device, to a network server to create at least one multi-path proxy instance. The at least one multi-path proxy instance is associated with the prioritized list of client application parameters for routing the data packets from the at least one client application. Each multi-path proxy instance of the at least one multi-path proxy instance is configured to aggregate and route data packets to a specific network link. The method also includes receiving identification information pertaining to the at least one multi-path proxy instance from the network server. In addition, the method includes, based on the identification information, assigning the prioritized list of client application parameters with the at least one multi-path proxy instance, to process data packets from the at least one client application.

In another aspect of the present subject matter, a client device is described. The client device includes a processor and a client connection engine (CCE) coupled to the processor. The CCE is configured to retrieve a prioritized list of client application parameters to process data packets from at least one client application. The prioritized list of client application parameters is generated based on application support capabilities of the client device. The CCE is further configured to transmit client parameters, indicative of communication capabilities of the client device, to a network server to create at least one multi-path proxy instance. The at least one multi-path proxy instance is configured to associate the prioritized list of client application parameters for routing the data packets from the at least one client application. Each multi-path proxy instance of the at least one multi-path proxy instance is configured to aggregate and route data packets to a specific network link. Also, the CCE is configured to receive identification information pertaining to the at least one multi-path proxy instance from the network server. In addition, the CCE is configured to, based on the identification information, assign the prioritized list of client application parameters with the at least one multi-path proxy instance, to process data packets from the at least one client application.

In another aspect of the present subject matter, a network server is described. The network server includes a processor and a network connection engine (NCE) coupled to the processor. The NCE is configured to transmit network parameters indicative of application support capabilities of the network server to an application server. In an example, the application server hosts an application. The NCE is configured to receive, based on the network parameters, a prioritized list of application parameters from the application server, for routing data packets to the application server. The NCE stores the prioritized list of application parameters for being used while routing the data packets to the application server.

In yet another aspect of the present subject matter, a non-transitory computer-readable medium is described. The non-transitory computer-readable medium comprises computer-readable instructions, which, when executed by a processor of a network server, cause the processor to transmit network parameters indicative of application support capabilities of the network server to an application server. The application server hosts an application. Further, the instructions cause the processor to, based on the network parameters, receive a prioritized list of application parameters based on the network parameters. The prioritized list of application parameters is for routing data packets to the application server. The instructions also cause the processor to store the prioritized list of application parameters for use while routing the data packets to the application server.

In yet another aspect of the present subject matter, a non-transitory computer-readable medium is described. The non-transitory computer-readable medium comprises computer-readable instructions, which, when executed by a processor of a client device, cause the processor to retrieve a prioritized list of client application parameters to process data packets from at least one client application. The prioritized list of client application parameters is generated based on application support capabilities of the client device. The instructions also cause the processor to transmit client parameters, indicative of communication capabilities of the client device, to a network server to create at least one multi-path proxy instance. The at least one multi-path proxy instance is associated with the prioritized list of client application parameters for routing the data packets from the at least one client application. Each multi-path proxy instance of the at least one multi-path proxy instance is configured to aggregate and route data packets to a specific network link. The instructions also cause the processor to receive identification information pertaining to the at least one multi-path proxy instance from the network server. In addition, the instructions cause the processor to, based on the identification information, assign the prioritized list of client application parameters with the at least one multi-path proxy instance, to process data packets from the at least one client application.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some implementations of system and/or methods in accordance with implementations of the present subject matter are now described, by way of example only, and with reference to the accompanying figures, in which.

DESCRIPTION OF IMPLEMENTATIONS

In order to allow fast uplink and downlink of data packets and high availability of network links, a network terminal, such as a network server, may allow a client device to connect simultaneously to multiple communication networks, by instantiating a multi-path proxy instance. The network server also configures aggregation and distribution protocols as well as tunneling and security protocols. To route the data packets being received from different applications, the network server associates a preferred multi-path proxy instance for routing data packets. For example, the preferred multi-path proxy instance may be selected based on data traffic on a specific network link or pre-defined routing rules.

However, current multi-access communication networks are rigid and do not provide the client device or the application server with the flexibility to select a preferred multi-path proxy instance or convergence and adaptation protocols for handling data packets from different applications. In a scenario, a video application implemented on the client device, may prefer Wi-Fi as the core network and to use User Datagram Protocol (UDP) based adaptation protocol using LTE access, for delivering data packets to the application server. In another scenario, a security sensitive application server may prefer to use LTE as the core network and use IPsec based adaptation protocol, if Wi-Fi access is used, for communication of data packets for the security sensitive application. As the network server decides the aggregation and distribution protocols and the tunneling and security protocols in addition to the core network links, the preferences of applications implemented on the client device and the application server are not taken into consideration. The existing multi-access communication network, thus, does not allow the client device or the application server to influence the decision of the network server.

Approaches for enabling application based routing of data packets in a multi-access communication network are described. In an aspect, an application server may share a prioritized list of application parameters for handling flow of data packets from the application server. Likewise, the client device may provide a prioritized list of multi-path proxy instances for processing the data packets from at least one client application. The network server may route the data packets in accordance with the prioritized lists provided by the client device and the application server. Thus, the present subject matter enables routing of data packets based on the preferences of the applications hosted in the application server and the applications installed in the client device.

In an example implementation, a network server may be queried by an application server hosting an application. In response to the query, the network server may transmit network parameters to the application server. The network parameters may be indicative of application support capabilities of the network server. For example, the network parameters may include the core networks that may be supported by the network server, network path tunneling and security protocols, and the network path aggregation and distribution protocols.

Based on the network parameters, the application server may create a prioritized list of application parameters for routing the data packets to and from the application server. In an example, the application parameters may include an application identifier, uplink and downlink traffic classifier, and so on. The network server may receive the prioritized list of application parameters from the application and store the prioritized list for being used while routing the data packets to and from the application server.

In another aspect, the client device may retrieve a prioritized list of client application parameters to process data packets from at least one client application. In an example, the prioritized list may be generated based on the preferences provided by at least one client application. The client device may retrieve the prioritized list of client application parameters from a memory of the client device. The client device may further negotiate capabilities with the network server. For example, the client device may transmit client parameters to the network server. The client parameters may be indicative of communication capabilities of the client device. Based on the client parameters, the network server may create at least one multi-path proxy instance to route the data packets from the at least one client application. Each multi-path proxy instance of the at least one multi-path proxy instance may have identification information. Each multi-path proxy instance of the at least one multi-path proxy instance is configured to aggregate and route data packets to a pre-defined core network link.

The client device may receive identification information pertaining to the at least one multi-path proxy instance from the network server. The identification information signifies a combination of a core network ID, convergence and adaptation protocols, and access links of the at least one multi-path proxy instance. Upon receiving the identification information, the client device may assign the prioritized list of client application parameters to the at least one multi-path proxy instance to process data packets from at least one client application. The network server stores the assigned multi-path proxy instances for routing the data packets.

The network server may route the data packets to the application server or to the client device, on the basis of the preferences of the application server or the client device, in the order of priority as listed in the prioritized lists. As would be understood, the above described techniques may allow the client device to select multi-path proxy instances for routing data packets from the client device. Further, the implementation of the above described techniques may allow the application server to provide preferred parameters for routing data packets from the application server, to facilitate effective and seamless multi-network communication.

The manner in which the aspects for enabling application based routing of data packets in a multi-access communication network shall be implemented will be explained in detail with respect to FIGS. 1-7. While aspects of the present subject matter may be implemented in any number of different computing systems, transmission environments, and/or configurations, the implementations are described in the context of the following system(s) as examples.

Figure 1:
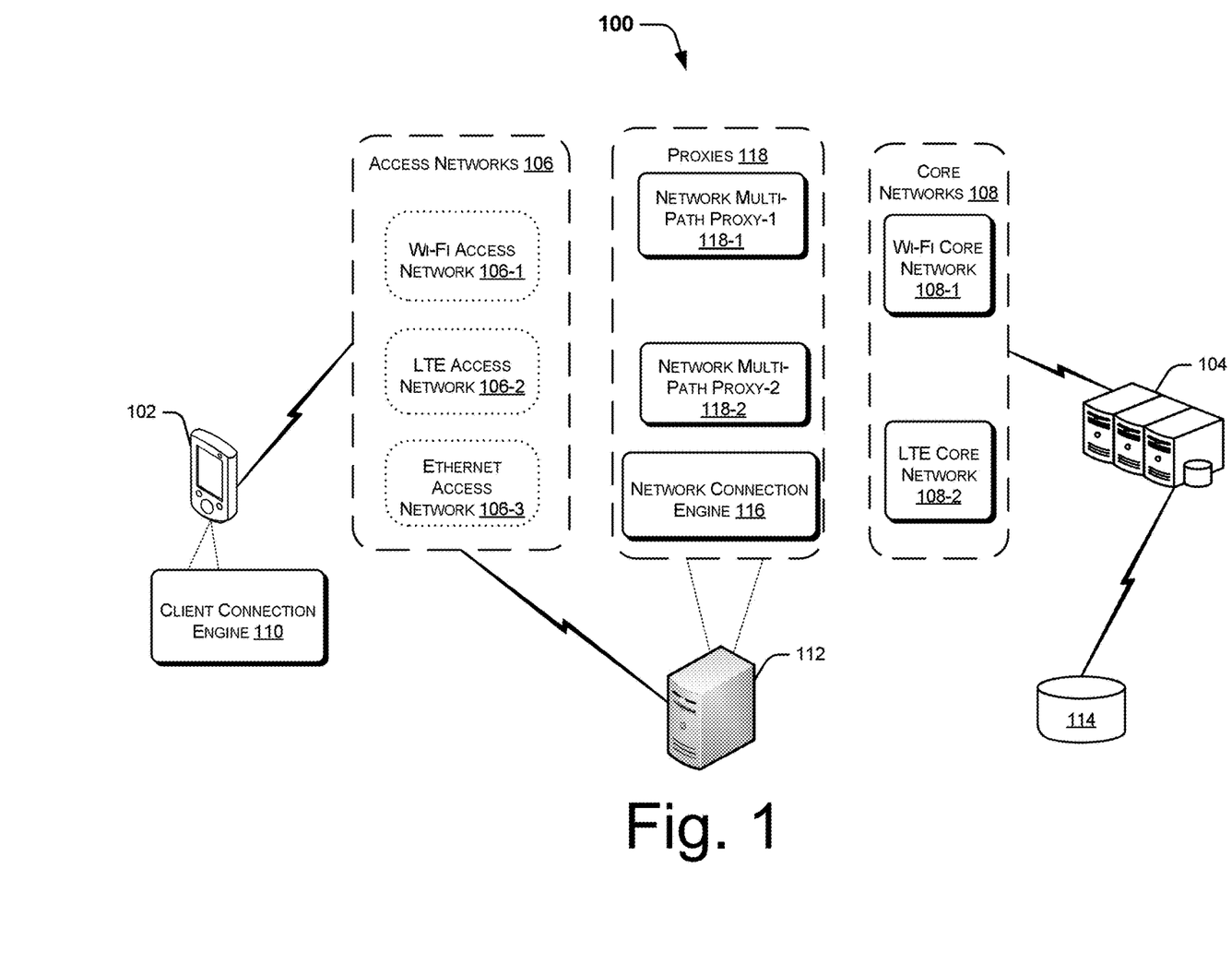
FIG. 1 illustrates a communication environment, according to an implementation of the present subject matter.

FIG. 1 illustrates a communication environment 100 for enabling application based routing of data packets from a client device 102 and an application server 104, according to an implementation of the present subject matter. In an example, the client device 102 may be a user equipment (UE) carrying out communications through multiple communication networks within the communication environment 100. The client device 102 may include any UE, such desktop computers, hand-held computing devices, portable computers, network computers, or wireless handheld devices, such as mobile phones, personal digital assistant (PDA), smart phones, multi-media enabled phones, and residential gateways which are capable of simultaneously communicating with multiple communication networks.

Each of the communication networks may be a wireless or a wired network, or a combination thereof. The communication network may be a collection of individual networks, interconnected with each other and functioning as a single large network, for example, the internet or an intranet. Few or all of the communication networks may be implemented as one of the different types of networks, such as local area network (LAN), wide area network (WAN), Wireless Local Area Network (WLAN), and such. The communication network may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

The client device 102 may communicate with the application server 104, hosting an application, to establish a communication session to access and exchange data. In an example, the application server 104 may be implemented as a central directory server, a database server, or a web server.

In one example, the client device 102 may use General Packet Radio Service (GPRS) along with other communication networks for communicating with the application server 104. In addition, few or all of the communication networks may be implemented as individual networks including, but are not limited to, 3GPP Long Term Evolution (LTE), Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). In other words, the communication networks may include cellular telecommunication networks, wired networks, wireless networks other than cellular telecommunication networks, or a mix thereof.

In an example implementation, the client device 102 may communicate with the application server 104 through a combination of different access networks 106 and core networks 108. The access networks 106 of the present subject matter may form a sub-part of the communication networks. In an example implementation of the present subject matter, the access networks 106 may be a cluster of multiple access networks, such as a Wi-Fi access network 106-1, an LTE access network 106-2, and an Ethernet access network 106-3. The core networks 108 may be a cluster of multiple core networks, such as a Wi-Fi core network 108-1 and an LTE core network 108-2. A core network 108 may be understood as a central part of the communication network that provides various services to client devices, such as the client device 102, which are connected by the access networks 106. In addition, the core network 108 may provide a gateway to other networks.

The access networks 106 and the core networks 108 may be implemented through different network entities, such as including routers, bridges, gateways, computing devices, and storage devices, depending on the technology; however, such details have been omitted for the sake of brevity.

In an example implementation of the present subject matter, the client device 102 may include a Client Connection Engine (CCE) 110. The CCE 110 may manage uplink and downlink data packet routings of the client device 102. In other words, the CCE 110 may manage multiple connections of the client device 102 with different communication networks, and may enable exchange of data through such different communication networks. The CCE 110 may be implemented as software or hardware logic within the client device 102.

The communication environment 100 may include a network server 112. In an example, the network server 112 may be implemented as a Mobile Edge Computing (MEC) server. The network server 112 may be registered with a service registry 114 in the MEC. The service registry 114 may be a database that may be populated with information of services that may be available in the communication environment 100. Although the network server 112 is depicted as the MEC server, it would be appreciated that the network server 112 may be implemented as any other network entity. In an example, the network server 112 may be located at a user plane path at an edge of access networks. The network server 112 may perform, control, or coordinate a service or resource in a communication network. The client device 102 and the application server 104 may communicate with the network server 112 to specify preferences while routing data packets from the client device 102 and the application server 104.

In an example, the network server 112 may include a Network Connection Engine (NCE) 116. In an example, each communication network of the communication environment 100 may implement one or more NCEs to communicate with more than one application server. In an example, the communication environment 100 depicts communication between the NCE 116 and one application server 104, but it will be appreciated that the NCE 116 may communicate with multiple application servers and the application server 104 may communicate with multiple network servers.

Credentials pertaining to the network server 112 may be provided to the client device 102 and the application server 104 for establishing a connection with the network server 112. In an example, the application server 104 may perform a service discovery with the service registry 114 to obtain credentials of the network server 112. In an example, a network address of the network server 112 may be pre-provisioned in the CCE 110. Based on the credentials, the CCE 110 may communicate with the network server 112.

Once the communication between the application server 104 and the network server 112 is established, the application server 104 provides a prioritized list of application parameters to the network server 112 for routing the data packets from the application server 104. The manner in which various components of the application server 104 and the network server 112 communicate with each other to enable application based routing of data packets from the application server 104, will be further described with reference to FIG. 2 and FIG. 3.

Referring back to FIG. 1, in an implementation, the one or more NCEs may be configured to communicate with CCEs of different client devices. In an example, the communication environment 100 depicts communication between the client device 102 and the network server 112, but it will be appreciated that the client device 102 may communicate with multiple network servers and the network server 112 may communicate with multiple client devices.

In an example, the CCE 110 may retrieve a prioritized list of client application parameters to process data packets from at least one client application. Further, the CCE 110 may communicate with the NCE 116 over a communication network (not shown in FIG. 1) to transmit client parameters of the client device 102. The client parameters may be indicative of communication capabilities of the client device 102. Examples of the communication capabilities may include interface capabilities and choice of multi-path protocol that may be utilized for routing the data packets from the client device 102. In addition, the communication capabilities may include choice of a core network through which the application server 104 is to be accessed.

Based on the client parameters of the client device 102, the NCE 116 may instantiate multiple Multi-Path Proxy (MPP) instances to associate with the prioritized list of client application parameters to route the data packets from the at least one client application. The MPP instances may include multiple Network MPP (NMPPs) 118 and multiple Client MPP (CMPPs). The MPP instances may handle uplink and downlink data packet routing of the client device 102, to enable the client device 102 to simultaneously communicate with multiple communication networks. The NMPPs 118 may be implemented by a network entity within the communication environment 100. In an example, the NMPPs 118 may provide multi-path connectivity to the network terminals, such as the client device 102.

The MPP instances may be a cluster of multiple network multi-path proxies, such as NMPP 118-1 and NMPP 118-2 and a cluster of multiple client multi-path proxies. In the present implementation, the client device 102 may be served by the NMPPs 118-1 and 118-2 and CMPPs, to address various user plane demands of multiple applications running on the client device 102. The NCE 116 may be implemented in the communication networks, such as in the access networks 106 or in the core networks 108. Further, the NMPPs 118 may also be implemented in the communication networks, such as in the access networks 106 or in the core networks 108.

As described earlier, the MPP instances may handle uplink and downlink data packet routing of the client device 102 to allow the client device 102 to communicate with multiple communication networks. In an example implementation, the CCE 110 may communicate with the NCE 116 to transmit client parameters indicative of communication capabilities of the client device 102. Upon receiving the client parameters, the NCE 116 may instantiate multiple MPP instances. For example, the NCE 116 may create multiple NMPPs 118 and share credentials pertaining to the NMPPs 118 to the CCE 110 to configure corresponding CMPPs. The MPP instances may be configured to aggregate and route data packets to a specific network link.

Further, the NCE 116 may share identification information pertaining to the MPP instances with the CCE 110. Based on the identification information, the CCE 110 may assign the prioritized list of client application parameters with one or more MPP instances for routing the data packets from the at least one client application. The manner in which various components of the client device 102 and NCE 116 communicate with each other to enable application based routing of data packets from the client device 102, will be further described in reference to FIG. 2 and FIG. 3.

Figure 2:
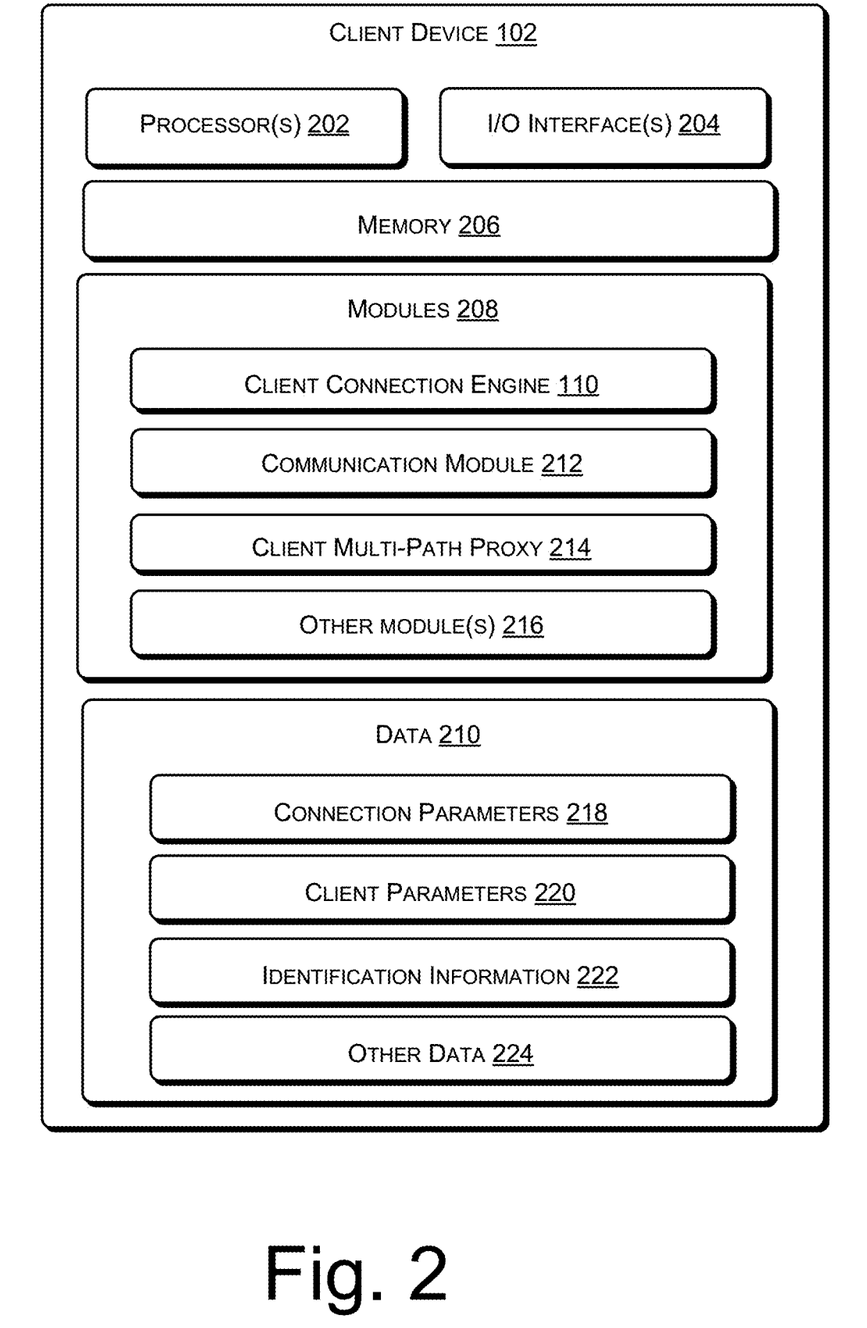
FIG. 2 schematically illustrates a client device, according to an implementation of the present subject matter.
Figure 3:
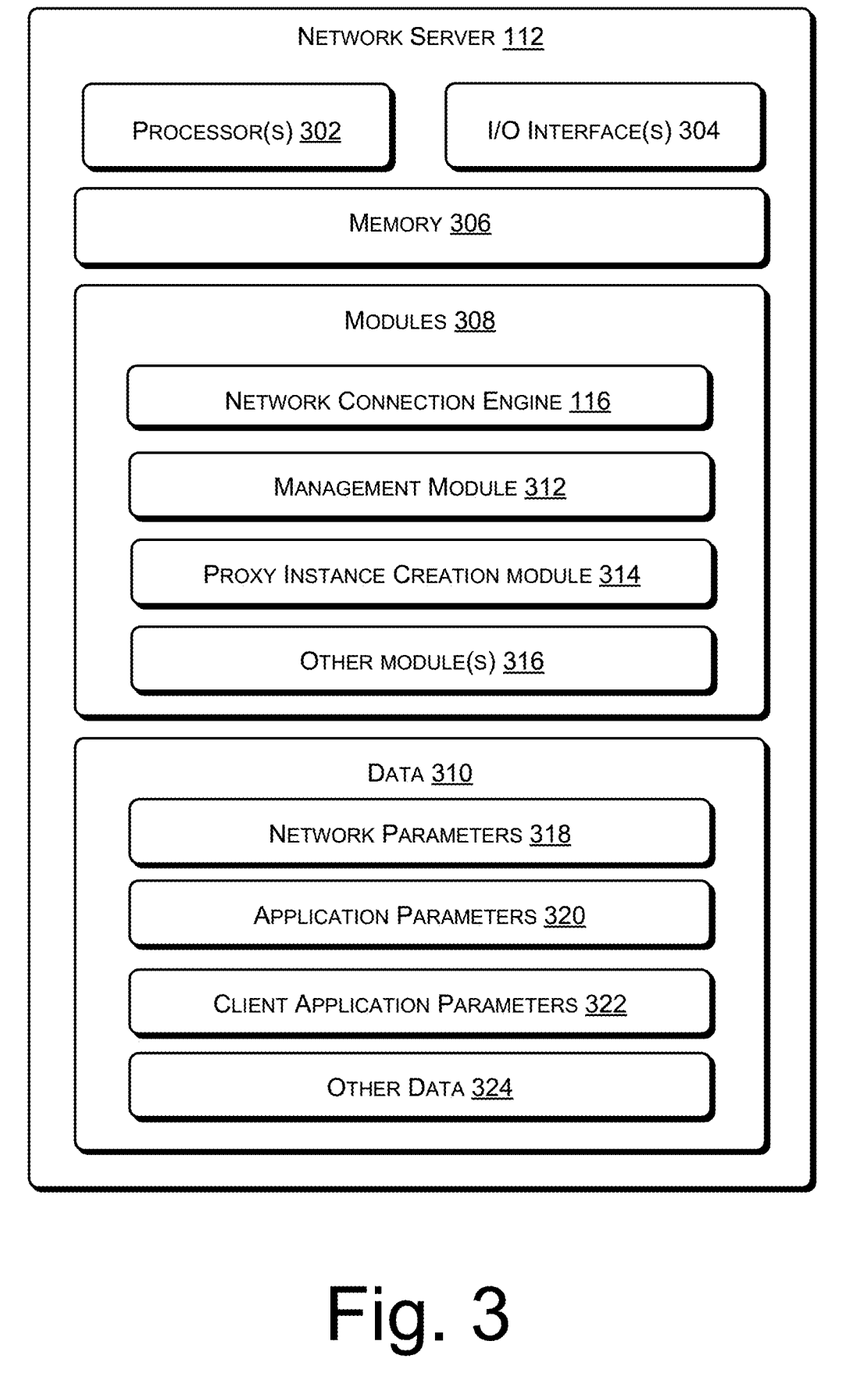
FIG. 3 schematically illustrates a network server, according to an implementation of the present subject matter.

FIGS. 2 and 3 schematically illustrate the client device 102 and the network server 112, respectively, in accordance with various implementations of the present subject matter. The client device 102 may include one or more processor(s) 202, I/O interface(s) 204, and a memory 206 coupled to the processor(s) 202. In another implementation, the network server 112 may include one or more processor(s) 302, I/O interfaces 304, and a memory 306 coupled to the processor(s) 302.

The processor(s) used in the client device 102 and the network server 112, can be a single processing unit or a number of units, all of which could include multiple computing units. The processor(s) may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions and data stored in the memory of the client device 102 and the network server 112.

The I/O interface(s) used in the client device 102 and the network server 112, may include a variety of software and hardware interfaces, for example, interfaces for peripheral device(s), such as a keyboard, a mouse, a display unit, an external memory, and a printer. Further, the I/O interface(s) may enable the client device 102 and the network server 112 to communicate with other devices, and other external databases (not shown). The I/O interface(s) can facilitate multiple communications within a wide variety of networks and protocol types, including wired networks, for example, local area network (LAN), cable, etc., and wireless networks, such as Wireless LAN (WLAN), cellular network, or satellite. For this purpose, the I/O interface(s) include one or more ports for connecting a number of computing systems with one another or to a network. In an example, the I/O interface(s) 204 may also allow the client device 102 to simultaneously connect to multiple communication networks. In another example, the I/O interface(s) 304 may also allow the network server 112 to connect to the NMPPs 118.

Memory (such as the memory 206 and the memory 306) may be any non-transitory computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In one implementation, the client device 102 also includes module(s) 208 and data 210. In an implementation, the network server 112 may include module (s) 308 and data 310.

The module(s) 208 and 308, amongst other things, may include routines, programs, objects, components, data structures, etc., which perform particular tasks or implement data types. The module(s) 208 and 308 may also be implemented as, signal processor(s), state machine(s), logic circuitries, and/or any other devices or components that manipulate signals based on operational instructions. Further, the module(s) 208 and 308 can be implemented in hardware, instructions executed by a processing unit, or by a combination thereof. The processing unit can comprise a computer, a processor, such as the processor(s) 202 and 302, a state machine, a logic array, or any other suitable devices capable of processing instructions.

In another aspect of the present subject matter, the module (s) 208 and 308 may be machine-readable instructions, firmware or software, which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can also be downloaded to the storage medium via the communication networks. In an example, the module (s) 208, amongst other things, may include the Client Connection Engine (CCE) 110, a communication module 212, a Client Multi-Path Proxy (CMPP) 214, and other module(s) 216. In an example, the module(s) 308, amongst other things, may include the Network Connection Engine (NCE) 116, a management module 312, a proxy instance creation module 314, and other module(s) 316.

Further, the data 210 and 310 serves, amongst other things, as a repository for storing data processed, received, and generated by the CCE 110 and the NCE 116 respectively. The data 210 includes connection parameters 218, client parameters 220, identification information 222, and other data 224. Further, the data 310 includes network parameters 318, application parameters 320, client application parameters 322, and other data 324. The other data 224 and 324 includes data generated as a result of the execution of the client device 102 and the network server 112 respectively.

For the ease of explanation, the communication between the client device 102 and the network server 112 has been explained with the help of components of the client device 102 and network server 112 described in FIG. 2 and FIG. 3, along with the different entities described in FIG. 1.

In an aspect, the network server 112 may receive a query from the application server 104 to share the network parameters 318 with the application server 104. The network parameters 318 may be indicative of the application support capabilities of the network server 112. In an example, the network parameters 318 may include core networks, network path aggregation and distribution protocols, and network path tunneling and security protocols, that may be supported by the network server 112. In an implementation, in order to query the network server 112 for the network parameters 318, the application server 104 may perform a service discovery to find the coordinates or credentials of the network server 112. In an example, the service discovery may be performed at the service registry 114 of the MEC. Based on the credentials, the application server 104 may establish a connection with the network server 112 through a communication network.

In response to the query from the application server 104, the network server 112 may transmit the network parameters 318 to the application server 104. Based on the network parameters 318, the application server 104 may generate a prioritized list of application parameters for routing the data packets from the application server 104. As may be understood, the prioritized list includes the application parameters in an order of priority. In an example, the prioritized list of application parameters may include an application server identifier, uplink (UL) and downlink (DL) traffic classifiers, core network types for routing the data packets, network path aggregation and distribution protocols for routing the data packets, and network path tunneling and security protocols for routing the data packets. The application identifier may indicate an ID of an application server.

The application server 104 may provide the prioritized list of application parameters to the network server 112. The application server 104 may thus, register a list of preferences for routing the data packets, with the network server 112. The network server 112 may receive the prioritized list of application parameters from the application server 104 and store the prioritized list of application parameters received from the application server 104 as the application parameters 320. In an example, network server 112 may provide one or more application parameters from the application parameters 320 to a client device, such as the client device 102 to be used for routing the data packets to the application server 104.

In another aspect, the client device 102 may include one or more applications installed in the client device 102 (hereinafter referred to as the client applications). The client applications may share a prioritized list of client application parameters with the client device 102. In an example, the prioritized list of client application parameters may be generated based on application support capabilities of the client device. Further, the client applications may communicate with the CCE 110 to provide the prioritized list of client application parameters. The prioritized list of client application parameters may indicate the preferences of the one or more client applications while handling data related to the client applications.

Further, the client device 102 may establish a connection with the network server 112 through a communication network. In an example implementation, the CCE 110 may establish the connection with the NCE 116 based on the connection parameters 218. The connection parameters 218 may include information pertaining to the network server 112. In an example, the client device 102 may query a discovery service to obtain the connection parameters 218.

For example, the connection parameters 218 may include parameters, such as link quality between the client device 102 and the network server 112 and distance of the network server 112 from the client device 102. In an example, the communication networks may include multiple network servers. To establish connection with one NCE, the CCE 110 may determine link quality between the client device 102 and each of the multiple network terminals along with the distance between the client device 102 and each of the multiple network terminals. The CCE 110 may determine any one NCE to establish the connection, based on the determination.

In an example, the connection parameters 218 may include pre-provisioned network address of the network server 112 based on which the CCE 110 may communicate with the NCE 116. Accordingly, the CCE 110 may directly establish a connection with the NCE 116 of the network server 112 whose network address is pre-provisioned in the communication parameters 218.

It would be appreciated that the CCE 110 and the NCE 116 may exchange multiple messages and may perform a handshake, and exchange data, such as Internet Protocol (IP) address of each other, to establish a secure connection between each other. In an example, the management module 312 of the network server 112 and the communication module 212 of the client device 102 may establish the secure connection between each other by exchanging messages in a predefined communication protocol, such as Extensible Markup Language (XML). In an example implementation, the CCE 110 may exchange XML messages with the NCE 116 through user plane data.

Upon establishing the connection between the CCE 110 and the NCE 116, the CCE 110 may transmit client parameters 220 of the client device 102 to the network server 112. In an example, the client parameters 220 may indicate the communication capabilities of the client device 102 and may include interface capabilities and choice of multi-path protocols that may be utilized for routing the data packets from the client device 102. For example, client device 102 may choose to route the data packets over a multi-path transport control protocol (MPTCP), with the application server 104.

In addition, the client parameters 220 may include choice of a core network through which the application server 104 is to be accessed. For example, the client device 102 may choose to access the application server 104 by using the LTE core network 108-2. The CCE 110 may also communicate different available configuration modes indicating a combination of available access networks 106 and available core networks 108.

In an example, the client parameters 220 may include choices of network path aggregation and distribution protocols and network path tunneling and security protocols, based on which the client device 102 may communicate with the core networks 108. For example, the client device 102 may support different flow aggregation and routing protocols, including Transmission Control Protocol (TCP), Generic Routing Encapsulation (GRE) tunneling protocol, User Datagram Protocol (UDP), and the MPTCP for flow aggregation and routing. In an example, the CCE 110 may either communicate with all different flow aggregation and routing protocols as the choice of communication, or may select one preferred flow aggregation and routing protocol, and share the same with the management module 312.

In an example implementation of the present subject matter, the NCE 116 may, based on the client parameters 220, instantiate the multiple MPP instances to enable the CCE 110 to associate the prioritized list of client application parameters to route the data packets from the one or more client applications. For example, based on the client parameters 220 of the client device 102, the proxy instance creation module 314 of the NCE 116 may create multiple instances of NMPPs 118 to facilitate flow aggregation and routing data packets to a specific network link In an example, each NMPP 118 may be configured to direct the data packets to a specific core network 108 for accessing the application server 104.

In an implementation, the proxy instance creation module 314 may create the NMPPs 118 based on the client parameters 220 of the client device 102. In an example implementation, the NCE 116 may be configured to cater to the Wi-Fi core network 108-1 and the LTE core network 108-2. Therefore, the proxy instance creation module 314 may create two instances of the NMPPs 118, such as the NMPP 118-1 and the NMPP 118-2 corresponding to the Wi-Fi access network 108-1 and the LTE core network 108-2 respectively.

Similar to the communication of the client parameters 220 of client device 102, by the CCE 110, the management module 312 may also communicate the capabilities of the NMPPs 118 with the CCE 110. Considering a scenario where the NMPPs 118 merely support the MPTCP for the flow aggregation and routing of the data packets. In such scenario, the management module 312 may share the choice of the MPTCP as the flow aggregation and routing protocol with the CCE 110.

Based on the shared capabilities, the CCE 110 and the NCE 116 may negotiate communication standards, such as a flow aggregation and routing protocol and tunneling and security protocol, negotiated between the CCE 110 and the NCE 116. The negotiated flow aggregation and routing protocol and the tunneling and security protocol may be utilized by the NMPPs 118 and the CMPPs 214, for managing flow aggregation and routing of data packets from the client device 102, while the client device 102 communicates with multiple communication networks.

In addition to the flow aggregation and routing protocols and the security and tunneling protocols, the communication standards may also define a combination of access networks 106 and core networks 108 to be utilized by the client device 102, for communicating with the application server 104. For example, the communication standards may define a combination of LTE access network 106-2 and LTE core network 108-2 for uplink establishment, but may define the LTE access network 106-2 along with the Wi-Fi core network 108-1 and LTE core network 108-2 for downlink establishment.

The management module 312 may communicate the communication standards negotiated with the CCE 110, to the NMPPs 118. Accordingly, the NMPPs 118 may be made aware of the flow aggregation and routing protocol to be utilized for the flow aggregation and routing of data packets for the client device 102, along with the combination of access networks 106 and the core networks 108, to be utilized for the establishment of the uplink and downlink channels for the client device 102.

In an example, the CCE 110 may establish a connection with the NMPPs 118 based on the identification information 222. The identification information 222 may include an MPP ID, a core network ID, access links, network path aggregation and distribution protocols, and network path tunneling and security protocols. In an implementation, the management module 312 may also communicate identification information 222 pertaining to the NMPPs 118 and corresponding network links, with the CCE 110. The identification information 222 may enable the CCE 110 to directly establish a connection with NMPPs 118.

In an implementation, the NCE 116 may provide the identification information 222 pertaining to the NMMPs 118, to the CCE 110. The CCE 110 may receive the identification information 222 from the network server 112, and based on the identification information 222, the CCE 110 may configure CMPPs 214 corresponding to the NMPPs 118. In an example, the configuring the CMPPs 214 may involve assigning specific NMPPs 118 to be used by the client device 102 based on a type of application. For example, through the prioritized list of client application parameters, a client application installed on the client device 102 may indicate its preference for an MPP instance for handling the data packets. Thus, based on the identification information 222, the CCE 110 may assign the prioritized list of client application parameters with the at least one MPP instance to process data packets from at least one client application. In an example, assigning the prioritized list may include assigning an MPP Id, and uplink and downlink traffic classifiers, corresponding to one or more client applications.

The client device 102 may share the information pertaining to the assigned MPP instances to the network server 112, to process data packets from the at least one client application. Association of different MPP instances with the prioritized list of client application parameters enables the client device 102 to provide preferences for handling data packets from different applications depending on their requirements. The network server 112 may store the prioritized list of client application parameters as the client application parameters 322. Further, the network server 112 may share the UL/DL traffic classifier for each client application that may be listed in the prioritized list.

In operation, the NCE 116 may, for each core network 108, configure the network path aggregation and distribution protocols and the network path tunneling and security protocols, as listed in the prioritized list of application parameters. The NCE 116 may, upon receiving a data packet routing request, use the UL traffic classifiers as provided by the application server 104 for UL data traffic. In an example, the NCE 116 may share the UL traffic classifiers with the CCE 110 through a traffic steering command In case of DL data traffic, the NMPPs 118 may provide the DL traffic classifier as provided by the client device 102.

Accordingly, the above described techniques may be utilized by the applications of the client device 102 as well as the application server 104 to provide preferences with respect to one or more NMPPs 118, core networks, aggregation and routing protocols, for routing the data packets.

In an implementation, the network server 112 may provide a default routing configuration for those applications which have not specified their preferences for handling data packets. For example, if the client device 102 hosts five applications and three applications have listed their preferences for handling data packets in the prioritized list of client application parameters, the NCE 116 may manage the data packets for the remaining two applications through the default routing configuration.

Figure 4:
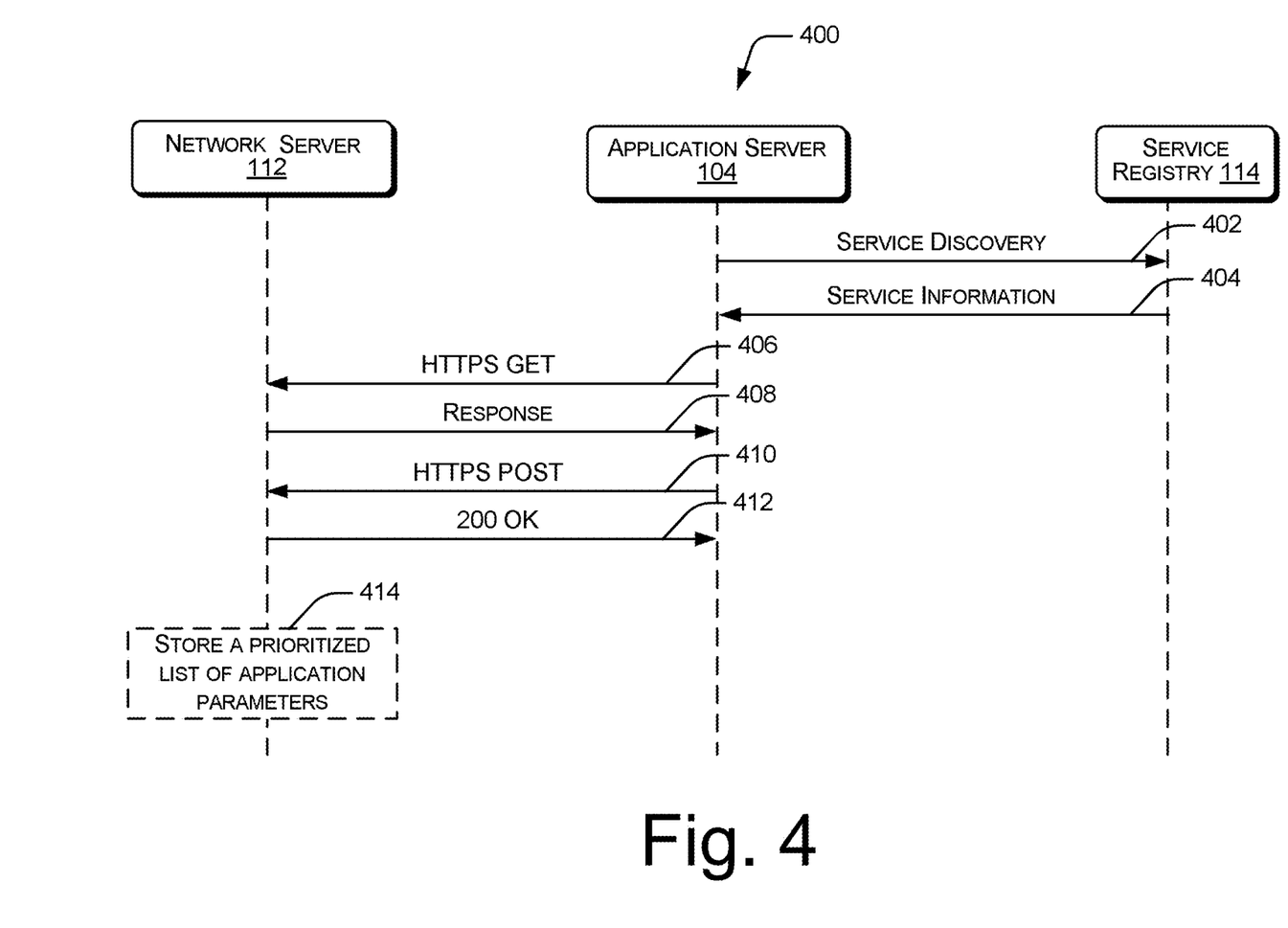
FIG. 4 illustrates an exemplary call flow diagram for enabling application based routing of data packets, according to an implementation of the present subject matter.
Figure 5:
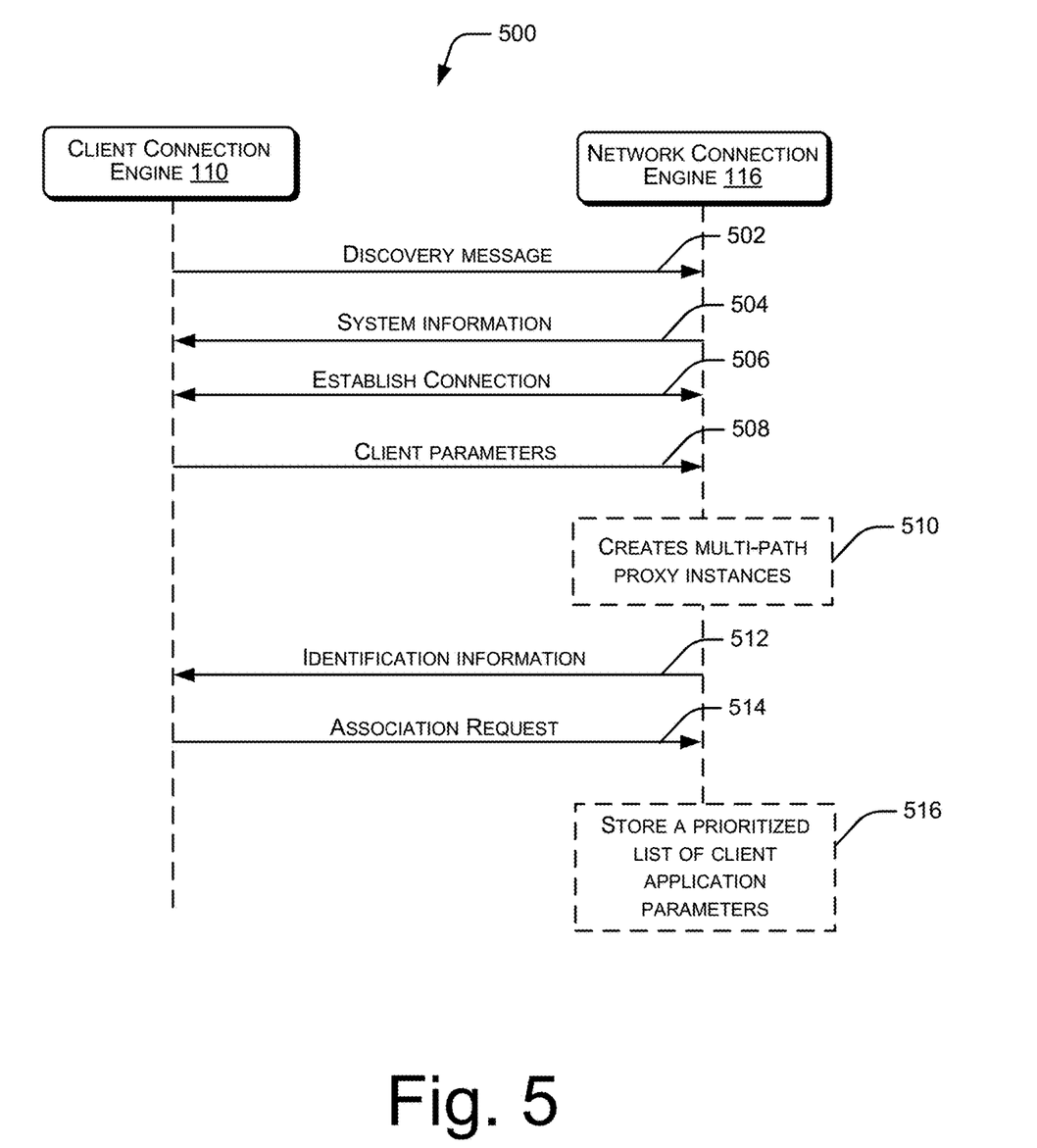
FIG. 5 illustrates another exemplary call flow diagram for enabling application based routing of data packets, according to an implementation of the present subject matter.

FIGS. 4 and 5 illustrates exemplary call flow diagrams 400 and 500 for enabling application based routing of data packets, according to an implementation of the present subject matter. The various arrow indicators used in the call flow diagrams 400 and 500 depict the transfer of data between the various entities in the communication environment 100 and between the client device 102 and the various entities in the communication network. Although in the description of FIG. 4, the network server 112 is implemented as an HTTPS server, it will be understood that the network server 112 can be implemented as other servers.

Referring to FIG. 4, at step 402, the application server 104 performs a SERVICE DISCOVERY on the service registry 114. The step of service discovery may be understood as requesting location of the network server 112 from the service registry 114. In an example, the network server 112 may be registered with the service registry 114 at the Multi-Access Edge Computing (MEC) site.

At step 404, the service registry 114 may share SERVICE INFORMATION pertaining to the network server 112 with the application server 104. In an example, the service registry 114 may provide location information, such as network address pertaining to the network server 112. Upon receiving the location information of the network server 112, the application server 104 may establish a communication session with the network server 112.

At step 406, once the communication session is established, network server 112 receives an HTTPS GET request from the application server 104. The HTTPS GET request indicates a query for receiving the network parameters 318 from the network server 112. In an example, the network parameters 318 are indicative of application support capabilities of the network server 112.

At step 408, the network server 112 sends a RESPONSE to the query. The response includes the network parameters 318, such as core networks, network path aggregation and distribution protocols, and network path tunneling and security protocols, that may be supported by the network server 112.

At step 410, the network server 112 receives an HTTPS POST message from the application server 104. In an example, the application server 104 may, based on the network parameters 318, generate a prioritized list of application parameters. The prioritized list indicates a list of preferential parameters, in an order of priority, that may be used for routing the data packets from the application server 104. Thus, the network server 112 may receive the prioritized list of the application parameters from the application server 104 in the HTTP POST message. In an example, the application parameters may include an application identifier, uplink and downlink traffic classifier, and so on.

The network server 112, at step 412, sends a 200 OK message to the application server 104 to acknowledge receipt of the prioritized list of application parameters. Further, at step 414, the network server 112 may store the prioritized list of application parameters as the application parameters 320. The network server 112 may provide one or more application parameters 320 to a client device for being used for routing the data packets to the application server 104.

Now referring to FIG. 5, at step 502, the client device 102 performs a service discovery to obtain a location of the network server 112. In an example, the CCE 110 of the client device 102 may send a DISCOVERY MESSAGE to the NCE 116 of the network server 112.

In response to the DISCOVERY MESSAGE, at step 504, the NCE 116 may send SYSTEM INFORMATION, to the CCE 110. In an example, the system information may include the IP address of the network server 112.

Based on the system information, at step 506, the CCE 110 may establish a connection with the NCE 116. Upon establishing the connection, the CCE 110 may communicate with the NCE 116.

In an implementation, at step 508, the CCE 110 may transmit the client parameters 220 to the NCE 116. In an example, the client parameters 220 may be indicative of the communication capabilities of the client device 102 and may include interface capabilities and choice of multi-path protocols that may be utilized for routing the data packets from the client device 102.

At step 510, based on the client parameters 220, the NCE 116 may create or instantiate multiple NMPPs, such as NMPPs 118 to facilitate flow aggregation and routing data packets to a specific network link In an example, the NCE 116 may share the communication capabilities of the NMPPs 118 with the CCE 110. Based on the shared capabilities, the CCE 110 and the NCE 116 may negotiate communication standards for managing flow aggregation and routing of data packets from the client device 102.

The NCE 116 may, at step 512, provide the identification information 222 pertaining to the NMMPs 118, to the CCE 110. Based on the identification information 222, the CCE 110 may configure CMPPs corresponding to the NMPPs 118. In an example, configuring the CMPPs may involve assigning specific NMPPs 118 to be used by the client device 102 based on a type of application. Thus, based on the type of application, the CCE 110 may select a particular MPP instance for handling the data packets.

At step 514, the CCE 110 may send an ASSOCIATION REQUEST to the NCE 116. The ASSOCIATION REQUEST indicates a request for assigning a prioritized list of client application parameters with the MPP instances to process data packets from at least one client application. In an example, the CCE 110 may retrieve the prioritized list of client application parameters from the memory 206, to process data packets from at least one client application. The prioritized list of client application parameters may be generated based on application support capabilities of the client device 102.

In an implementation, the ASSOCIATION REQUEST may include MPP Id and uplink (UL) and downlink (DL) traffic classifiers corresponding to the at least one client application.

Further, at step 516, the NCE 116 may store the prioritized list of client application parameters as the client application parameters 322. The NCE 116 may utilize the client application parameters 322 while handling the data packets coming from or going to the client device 102. For example, the NCE 116 may use a particular MPP instance and the UL traffic classifier, as provided by the CCE 110, while routing data packets from the client device 102 to the application server 104.

Figure 6:
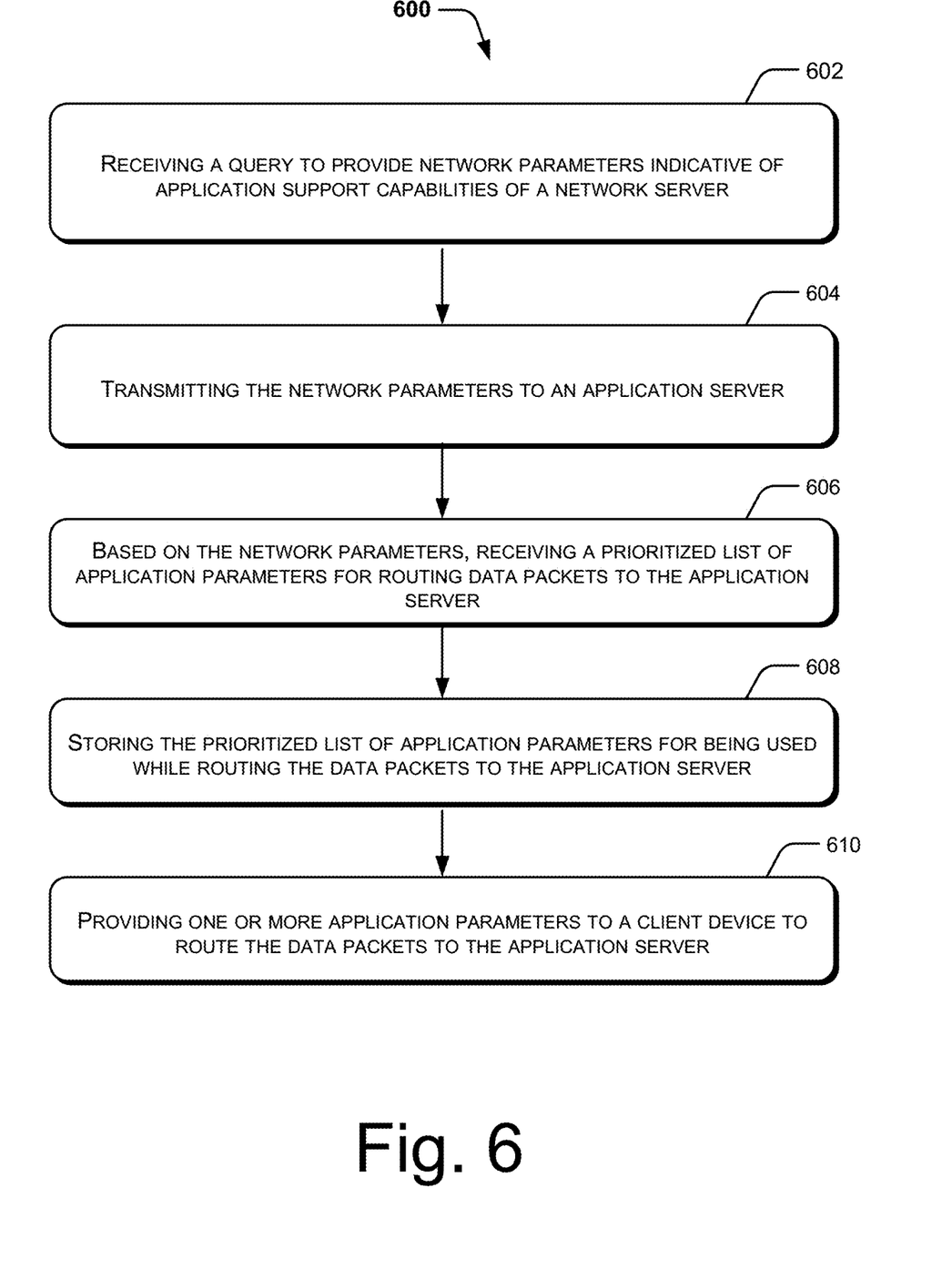
FIG. 6 illustrates a method for enabling application based routing of data packets, according to an implementation of the present subject matter.
Figure 7:
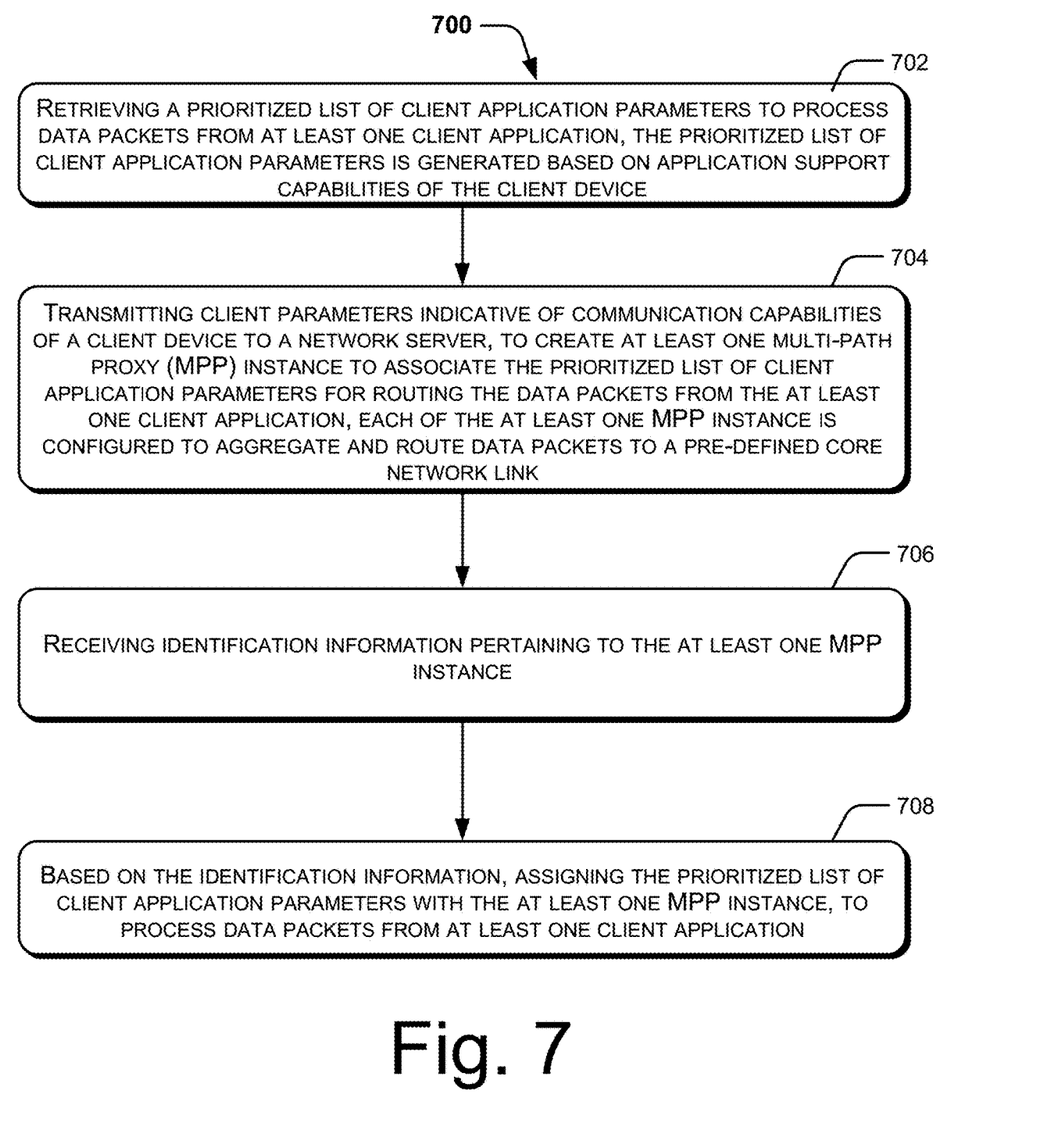
FIG. 7 illustrates another method for enabling application based routing of data packets, according to an implementation of the present subject matter.

FIG. 6 and FIG. 7 illustrate methods 600 and 700 for enabling application based routing of data packets. The order in which the methods 600 and 700 are described is not intended to be construed as a limitation, and any number of the described method blocks can be combined in any order to implement the methods 600 and 700, or an alternative method. Additionally, individual blocks may be deleted from the methods 600 and 700 without departing from the spirit and scope of the subject matter described herein. Furthermore, the methods 600 and 700 can be implemented in any suitable hardware, software, firmware, or combination thereof.

The methods 600 and 700 may be described in the general context of computer executable instructions. Generally, computer executable instructions can include routines, programs, objects, components, data structures, procedures, modules, functions, etc., that perform particular functions or implement particular abstract data types. The methods 600 and 700 may also be practiced in a distributed computing environment where functions are performed by remote processing devices that are linked through multiple communication networks.

A person skilled in the art will readily recognize that steps of the methods 600 and 700 can be performed by network entities, communicating in a communication environment. Herein, some implementations are also intended to cover program storage devices, for example, digital data storage media, which are machine or computer readable and encode machine-executable or computer-executable programs of instructions, wherein said instructions perform some or all of the steps of the described methods 600 and 700. The program storage devices may be, for example, digital memories, magnetic storage media, such as a magnetic disks and magnetic tapes, hard drives, or optically readable digital data storage media. The implementations are also intended to cover all the communication networks and communication devices configured to perform said steps of the methods 600 and 700.

In an implementation, the method 600 may be performed by a network connection engine, such as NCE 116, implemented within the network server 112. Further, the method 700 may be performed by a client communication engine, such as the CCE 110 implemented within the client device 102. For the sake of brevity of description of FIGS. 6 and 7, the different components performing the various steps of the methods 600 and 700 are not described in detail. Such details are provided in the description provided with reference to FIGS. 1-5.

Referring to FIG. 6, at block 602, a query may be received by the network server 112 to provide network parameters of the network server 112. For example, the NCE 116 residing at the network server 112, may receive the query from the application server 104. In an example, the network parameters may be indicative of application support capabilities of the network server 112.

At block 604, the network parameters of the network server 112 may be transmitted. For example, the NCE 116 may transmit the network parameters to the application server 104.

At block 606, the network server 112 may receive a prioritized list of application parameters for routing the data packets to the application server 104. The prioritized list of application parameters may be received based on the network parameters of the network server 112. In an example, the prioritized list of application parameters may include an application server identifier, uplink (UL), and downlink (DL) traffic classifiers, core network types for routing the data packets, network path aggregation and distribution protocols for routing the data packets, and network path tunneling and security protocols for routing the data packets.

At block 608, the network server 112 may store the prioritized list of application parameters for being used while routing the data packets to the application server 104. In an example, the prioritized list of application parameters may also be used by the application server 104 to route the data packets from the application server 104. The application server 104 may thus, register a list of preferences for routing the data packets, with the network server 112.

Further, at block 610, the network server 112 may provide one or more application parameters to a client device, such as the client device 102, to facilitate routing the data packets to the application server 104.

Referring to FIG. 7, at block 702, a prioritized list of client application parameters may be retrieved. In an example, the CCE 110 may retrieve the prioritized list of client application parameters from the memory 206 of the client device 102. In an implementation, the prioritized list of client application parameters may be generated by one or more client applications, based on application support capabilities of the client device 102.

At block 704, client parameters of the client device 102 may be transmitted to the network server 112 to create at least one multi-path proxy instance. The client parameters may be indicative of the communication capabilities of the client device 102. For example, the CCE 110 may transmit the client parameters to the NCE 116 residing at the network server 112 to create at least one multi-path proxy (MPP) instance. In an example, the MPP instances may be associated with the prioritized list of client application parameters to route the data packets from the at least one client application. Each of the MPP instances is configured to aggregate and route the data packets to a pre-defined core network link.

At block 706, identification information pertaining to the MPP instances may be received. In an example, the CCE 110 may receive the identification information associated with the NMPPs 118. The identification information may include a core network ID, access links, network path aggregation and distribution protocols, and network path tunneling and security protocols. In an implementation, the identification information may be received by the communication module 212 of the client device 102.

At block 708, based on the identification information, the prioritized list of client application parameters may be assigned to the at least one multi-path proxy instance to process data packets from at least one client application. In an example, the CCE 110 may assign the prioritized list of client application parameters to process data packets from at least one client application. In an example, assigning the prioritized list of client application parameters may include associating MPP Id and uplink (UL) and downlink (DL) traffic classifiers with the at least one client application.

The above described methods 600 and 700 may allow the client device 102 and the application server 104 to enable application based routing of data packets based on the prioritized list of client application parameters and the prioritized list of application parameters respectively.

Although implementations of the present subject matter have been described in a language specific to structural features and/or methods, it is to be understood that the appended claims are not necessarily limited to the specific features or methods described. Rather, the specific features and methods are disclosed as examples of the present subject matter.

The invention claimed is:

1. A method comprising:
retrieving, by a client connection engine in a client device, a prioritized list of client application parameters to process data packets from at least one client application, wherein the prioritized list of client application parameters is generated based at least in part on application support capabilities of the client device;
transmitting client parameters to a network server to create at least one multi-path proxy instance to associate with the prioritized list of client application parameters for routing the data packets from the at least one client application, wherein the client parameters are indicative of communication capabilities of the client device, wherein each multi-path proxy instance of the at least one multi-path proxy instance is configured to aggregate and route data packets to a pre-defined core network link;
receiving identification information pertaining to the at least one multi-path proxy instance from the network server; and
based at least in part on the identification information, assigning the prioritized list of client application parameters to the at least one multi-path proxy instance to process data packets from the at least one client application.

2. The method as claimed in claim 1, wherein the identification information comprises a core network identifier, access links, network path aggregation and distribution protocols, and network path tunneling and security protocols.

3. The method as claimed in claim 1, further comprising receiving, from the network server, uplink and downlink traffic classifiers for each multi-path proxy instance from the prioritized list of client application parameters.

4. The method as claimed in claim 1, wherein the prioritized list of client application parameters is for routing the data packets over a multi-access communication network supporting two or more access technologies.

5. The method as claimed in claim 4, wherein the two or more access technologies comprise two or more different network types supported by the network server, the two or more different network types comprising at least one of two or more different access networks and two or more different core networks.

6. The method as claimed in claim 4, wherein the two or more access technologies comprise two or more different network path tunneling and security protocols supported by the network server.

7. The method as claimed in claim 4, wherein the two or more access technologies comprise two or more different network path aggregation and distribution protocols supported by the network server.

8. The method as claimed in claim 1, wherein the prioritized list of client application parameters is for aggregation and routing of data packets to an application server.

9. A client device comprising:
a processor;
a client connection engine coupled to the processor, the client connection engine is configured to:
retrieve a prioritized list of client application parameters to process data packets from at least one client application, wherein the prioritized list of client application parameters is generated based at least in part on application support capabilities of the client device;
transmit client parameters to a network server to create at least one multi-path proxy instance to associate with the prioritized list of client application parameters to route the data packets from the at least one client application, wherein the client parameters are indicative of communication capabilities of the client device, wherein each multi-path proxy instance of the at least one multi-path proxy instance is configured to aggregate and route data packets to a pre-defined core network link;
receive identification information pertaining to the at least one multi-path proxy instance from the network server; and
based at least in part on the identification information, assign the prioritized list of client application parameters to the at least one multi-path proxy instance to process data packets from the at least one client application.

10. The client device as claimed in claim 9, wherein the client parameters comprise core networks, access links, network path aggregation and distribution protocols, and network path tunneling and security protocols, supported by the client device.

11. The client device as claimed in claim 9, wherein the identification information comprises a core network identifier, network path aggregation and distribution protocols, network path tunneling and security protocols, and access links.

12. The client device as claimed in claim 9, wherein the prioritized list of client application parameters comprises uplink and downlink traffic classifiers corresponding to the at least one client application.

13. The client device as claimed in claim 9, wherein the prioritized list of client application parameters is for routing the data packets over a multi-access communication network supporting two or more access technologies.

14. The client device as claimed in claim 13, wherein the two or more access technologies comprise two or more different network types supported by the network server, the two or more different network types comprising at least one of two or more different access networks and two or more different core networks.

15. The client device as claimed in claim 13, wherein the two or more access technologies comprise two or more different network path tunneling and security protocols supported by the network server.

16. The client device as claimed in claim 13, wherein the two or more access technologies comprise two or more different network path aggregation and distribution protocols supported by the network server.

17. The client device as claimed in claim 9, wherein the prioritized list of client application parameters is for aggregation and routing of data packets to an application server.

18. A non-transitory computer-readable medium comprising computer-readable instructions, which, when executed by a processor of a client device, cause the processor to:

retrieve a prioritized list of client application parameters to process data packets from at least one client application, wherein the prioritized list of client application parameters is generated based at least in part on application support capabilities of the client device;

transmit client parameters to a network server to create at least one multi-path proxy instance to associate with the prioritized list of client application parameters to route the data packets from the at least one client application, wherein the client parameters are indicative of communication capabilities of the client device, wherein each multi-path proxy instance of the at least one multi-path proxy instance is configured to aggregate and route data packets to a pre-defined core network link;

receive identification information pertaining to the at least one multi-path proxy instance from the network server; and based at least in part on the identification information, assign the prioritized list of client application parameters to the at least one multi-path proxy instance to process data packets from the at least one client application.

19. The non-transitory computer-readable medium as claimed in claim 18, wherein the prioritized list of client application parameters comprises a multi-path proxy identifier and uplink and downlink traffic classifiers corresponding to the at least one client application.

20. The non-transitory computer-readable medium as claimed in claim 18, wherein the prioritized list of client application parameters is for routing the data packets over a multi-access communication network supporting two or more access technologies.

\* \* \* \* \*